UNITED STATES PATENT OFFICE.

NILS NILSON AND LEONARD NILSON, OF WAYZATA, MINNESOTA.

HARVESTER.

1,164,306.  Specification of Letters Patent.  Patented Dec. 14, 1915.

Application filed May 29, 1911. Serial No. 630,224.

*To all whom it may concern:*

Be it known that we, NILS NILSON and LEONARD NILSON, of Wayzata, Hennepin county, Minnesota, have invented certain new and useful Improvements in Harvesters, of which the following is a specification.

The primary object of our invention is to provide a harvesting apparatus which can be easily and quickly attached to a traction engine and as readily removed therefrom, to the end that the engine may be used for operating the harvesting apparatus and for other purposes around the farm when the harvesting apparatus is removed. It will thus be unnecessary to provide a traction and operating means for the harvester independently of the means for operating the other farm implements.

A further object is to provide a connection between the traction engine and the harvesting apparatus which will permit of the operation of the cutter-bar and carrier belts at a uniform, continuous speed while the traction wheel of the engine, operated from the same source of power, may be driven at a variable speed, thus permitting the operator to slow down the machine or increase its speed according to the character of the grain that is being cut without altering the speed of operation of the harvesting device.

Other objects of the invention will appear from the following detailed description.

The invention consists generally in various constructions and combinations, all as hereinafter described and particularly pointed out in the claims.

Figure 1:
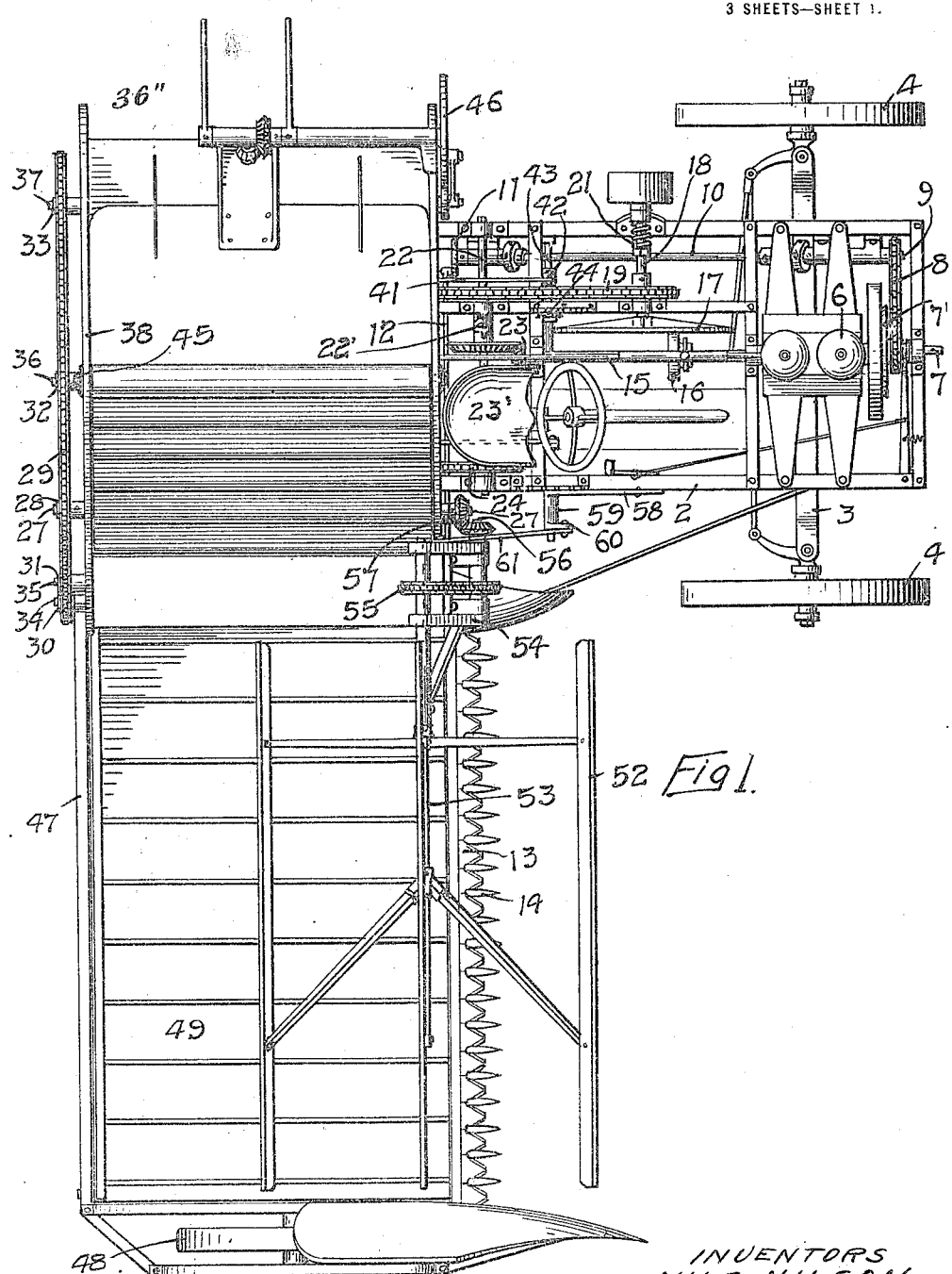
Figure 2:
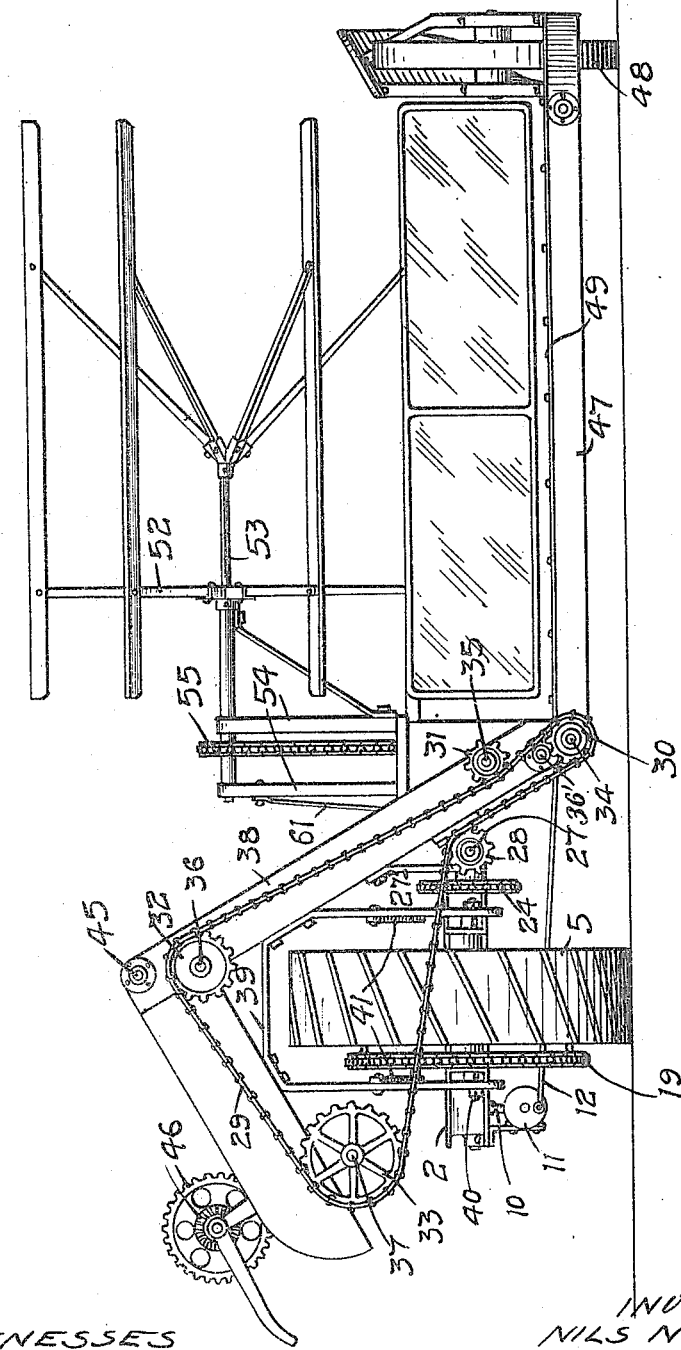
Figure 3:
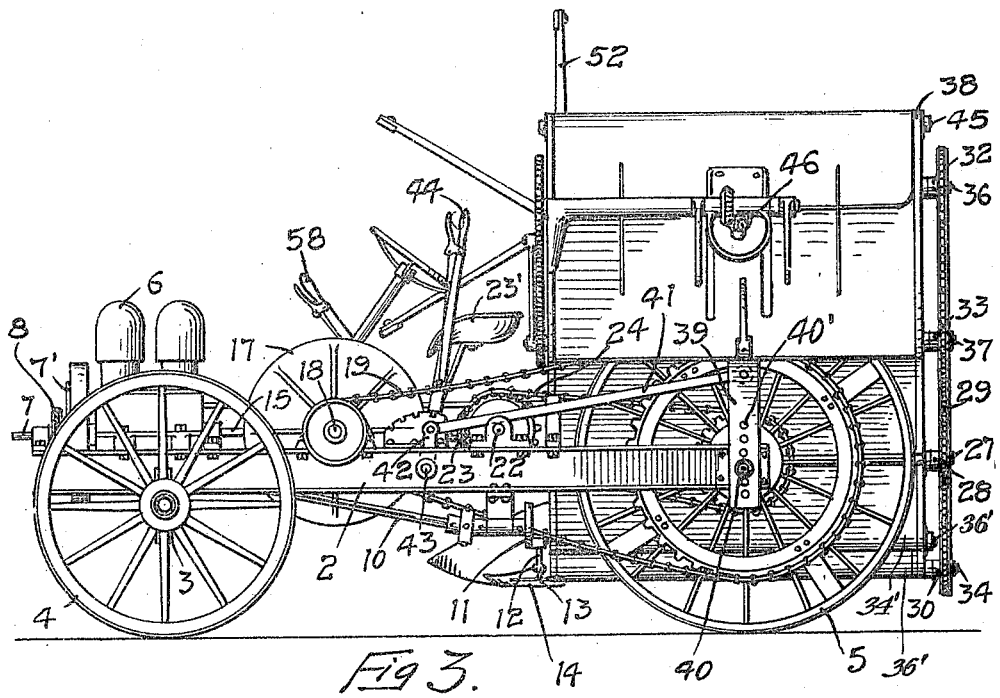
Figure 4:
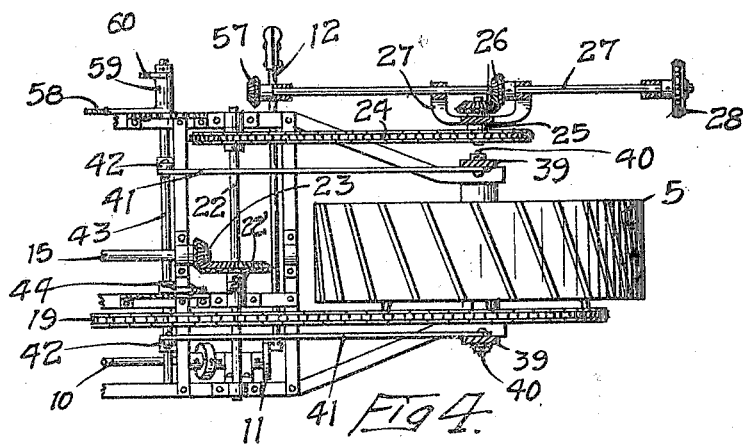

In the accompanying drawings forming part of this specification, Figure 1 is a plan view of a harvesting machine embodying our invention, Fig. 2 is a rear view of the same, Fig. 3 is a side elevation, Fig. 4 is a detail view illustrating the driving connections between the traction wheel and the source of power, and the mechanism for driving the harvester reel.

In the drawings, 2 represents the frame of the machine, having a forward axle 3 and forward wheels 4. The rear portion of the machine frame is supported, preferably, by a single traction wheel 5, mounted in bearings in the frame 2.

6 represents a source of motive power, such as a gas engine, located, preferably, on the forward portion of the frame 2 and having a shaft 7 provided with a clutch 7' and connected by a belt 8 with a shaft 9, extending lengthwise of said frame and connected through a shaft 10 with a crank disk 11 and a pitman rod 12, which operates a cutter-bar 13 arranged to reciprocate in the usual way in the finger bar 14. The operation of the cutter-bar through these connections will be continuous and uniform. The driving shaft 15 extends backwardly from the source of motive power and carries a friction drive wheel 16 slidable thereon and adapted to engage a friction disk 17 mounted on a shaft 18. This shaft and disk are movable toward the friction wheel by the tension of a spring 21. By the adjustment of the friction wheel the speed of the traction wheel driven through the friction disk may be increased or decreased, according to the character of the ground over which the machine is moving or the grain in which the cutter-bar is operating.

Near the end of the drive shaft 15 is a transverse counter-shaft 22, geared at 23 to the drive shaft and driven therefrom. This shaft is provided with a clutch 22' near the driver's seat 23' to allow the operator of the engine to stop or start the counter shaft and the mechanism connected therewith.

A belt 24 extends backwardly from this countershaft and drives a hub 25 that is geared at 26 to a shaft 27, and is mounted on a bracket 27'. The shaft 27 has a sprocket wheel 28 meshing with a chain belt 29 which engages sprocket wheels 30, 31, 32 and 33 on the shafts 34, 35, 36 and 37. These shafts are journaled in a carrier frame 38 that is mounted on the upper portion of the yoke 39, the lower portion of which straddles the traction wheel 5 and is vertically adjustable by means of bolts 40 and holes 40' on the machine frame. (See Fig. 3.) This yoke has an oscillating movement on its pivots forward and backward and is operated by means of tilting bars 41 connected to arms 42 on a rock shaft 43 that is operated by a lever 44. The shafts 36 and 36' carry the lower grain elevating belt or apron 34' and the shafts 35 and 45 carry the upper belt 36''; between which belts the grain is elevated. These belts are common to all harvesting machines and we have not thought it necessary to illustrate or describe them in detail herein. The shaft 37 drives the binder mechanism 46, which is also of common construction, and operates in substantially the same manner as in an ordinary harvester.

The frame 38 is rigid on the yoke 39 and tilts forward or backward therewith, and a horizontal frame 47 is pivoted on the shaft 34 and is supported at its outer end by a grain wheel 48. A horizontal carrier 49 operates in this horizontal frame and delivers the grain to the elevating apron in the usual way. The pivots of this horizontal frame on the shaft 34 allow the frame to oscillate and adapt itself to the inequalities of the ground over which the machine may be moving, and its sole connection with the traction engine is through the frame 38 and the yoke 39, so that when the yoke is tilted, both the frames 38 and 47 will be tilted. The forward portion of the frame 47 supports the finger bar and the cutter-bar, heretofore described, and the tilting of the frame 47 will impart a corresponding movement to said bars.

Above the cutter-bar is a reel 52 mounted on a shaft 53 that is journaled in bars 54 which bars are supported on the frame 38. The shaft 53 has a driving connection 55 with a short shaft 56 that is geared at 57 to the forward end of the shaft 27. (See Figs. 1 and 4.) This reel is capable of oscillation on its supports and is operated, preferably, by a lever 58, mounted on a hub 59 that is journaled on the shaft 43 and has an arm 60 connected with one of the bars 54 by a strap 61. Oscillation of the reel forward or backward is thus permitted to adjust it in any preferred position with respect to the cutter-bar.

In the operation of the machine, the frame 38 and yoke 39 are mounted on the traction engine, the position of the yoke having been previously determined so that the cutter-bar will be in alinement with the pitman for convenient adjustment thereto. The traction engine thus forms the operating mechanism for the harvester, the rear traction wheel performing its usual function for the engine, and the cutter-bar being positively driven from the source of power.

We regard the location of the harvesting mechanism with respect to the traction wheels as of particular importance, as the weight of the elevator and the parts connected therewith is transferred directly through the vertically adjustable yoke to the axle of the traction wheel and materially increases the traction of the wheel and relieves the forward portion of the machine of its load, and therefore allows the steering wheels to be operated with greater facility.

The operation of the harvesting attachment when connected with the traction engine will be substantially the same as in an ordinary harvester. The weight of the frame 38 will be supported by the rear wheel of the traction engine and will increase the traction of this wheel. Whenever desired the yoke 39 may be detached from the traction engine and the engine used for operating any other agricultural implement.

We claim as our invention:—

1. The combination, with a traction machine having forward carrying and guiding means and a rear traction wheel, of a harvesting mechanism having a raised portion at one end straddling said traction wheel and pivotally supported by the axle of said wheel, said harvesting mechanism having a laterally extending part adjacent to the ground line provided with a carrying wheel, a cutter bar mounted in said laterally extending part and operatively connected with said traction machine, and means for tilting said harvesting mechanism forward or backward on its supports to raise or lower the teeth of said cutter bar.

2. The combination, with a traction machine having forward carrying and steering means and a rear traction wheel and axle therefor, of a harvester mechanism comprising an apron frame overhanging said traction wheel and supported thereby, a cutter bar frame having a pivotal connection with said apron frame at one end and a carrying wheel at its outer end, a cutter bar mounted in said cutter bar frame, and a source of motive power mounted on said traction machine and having a driving connection with said cutter bar.

3. The combination, with a traction machine having forward carrying and guiding means and a rear traction wheel, of a yoke straddling said rear traction wheel, an apron frame overhanging said traction wheel and secured to said yoke, a shaft mounted in said apron frame, a cutter bar frame pivoted at one end on said shaft and having a carrying wheel at its opposite end, a cutter bar mounted in said cutter bar frame and having a driving connection with said traction machine, the disconnecting of said driving connection and the removal of said yoke from its bearings permitting the separation of said harvesting mechanism from said traction machine.

4. The combination, with a traction machine having forward carrying and guiding means and a rear traction wheel, of a yoke mounted to straddle said rear traction wheel and vertically adjustable on its support, a harvesting mechanism secured to said yoke and overhanging said traction wheel and having a horizontal extension near the ground line and a carrying wheel therefor, a cutter bar mounted in said horizontal extension and vertically movable with said yoke, and a driving connection between said cutter bar and said traction machine.

5. A traction machine comprising a frame having forward carrying and steering means, a source of motive power mounted on said frame and a rear traction wheel journaled in said frame, a harvesting apparatus comprising a frame overhanging said traction wheel and pivotally supported, said harvesting apparatus having a horizontal frame and carrying wheel therefor and a finger bar, a cutter bar operatively connected with said source of power, and a lever mechanism mounted on said traction machine and connected with said harvesting apparatus for tilting it forwardly or backwardly on its pivots to raise or lower the teeth of said cutter bar.

6. The combination, with a traction machine having forward carrying and guiding means and a rear traction wheel, of a harvesting apparatus comprising an apron frame overhanging said rear traction wheel and supported on the traction wheel axle, said harvesting apparatus also including a horizontal frame connected to said apron frame on one side of said traction wheel and extending outwardly therefrom and having a carrying wheel, a cutter bar mounted in said horizontal frame and having driving connections with said traction machine, the disconnecting of said driving connection from said cutter bar and said apron frame from said traction wheel axle permitting the removal of said harvesting apparatus from said traction machine.

7. The combination, with a traction machine having forward carrying and guiding means and a source of motive power interposed between said forward wheels and a rear traction wheel, of a yoke straddling said rear traction wheel and having bearings on each side thereof, brace bars connecting said yoke above its bearings with said traction machine frame and resisting backward pull on said yoke, a harvesting apparatus comprising an apron frame mounted on said yoke and overhanging said traction wheel, and a horizontal frame connected with said apron frame and provided with a carrying wheel, a cutter bar mounted in said horizontal frame and operatively connected with said source of motive power, the backward pull on said harvesting apparatus when at work exerting a lifting strain on the forward portion of said traction machine through said yoke and brace bars and increasing the traction of said traction wheel.

8. The combination, with a traction machine having forward carrying and guiding wheels and a rear traction wheel, of a support mounted on said frame and projecting above the axis of said traction wheel, a harvesting mechanism comprising an apron frame mounted on said support and overhanging said traction wheel, a cutter bar frame connected with said apron frame and having an outer carrying wheel, a cutter bar mounted in said cutter bar frame and operatively connected with said traction machine, the connection of said harvesting mechanism with said traction machine through said support operating to exert a backward tilting movement on said machine when said cutter bar is at work, thereby increasing the traction of said wheel and lessening the weight on said steering wheels.

In witness whereof, we have hereunto set our hands this 24th day of May, 1911.

NILS NILSON.
LEONARD NILSON.

Witnesses:
GENEVIEVE E. SORENSEN,
EDWARD A. PAUL.